J. A. ROBERTSON.
CAMERA.
APPLICATION FILED OCT. 2, 1907.
917,135.
Patented Apr. 6, 1909.
2 SHEETS—SHEET 1.
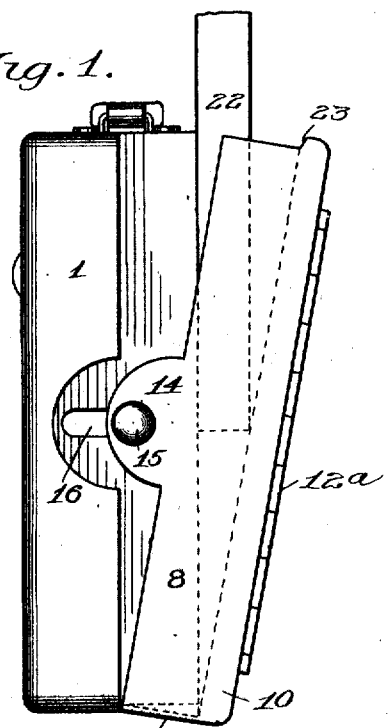
Fig. 1.
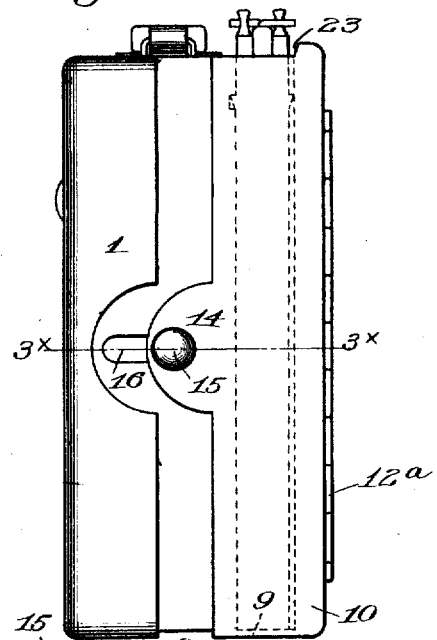
Fig. 2.
Fig. 3.
Witnesses
Walter B. Payne.
Russell B. Griffith.
Inventor
John A. Robertson
By Church & Rich
Attorneys

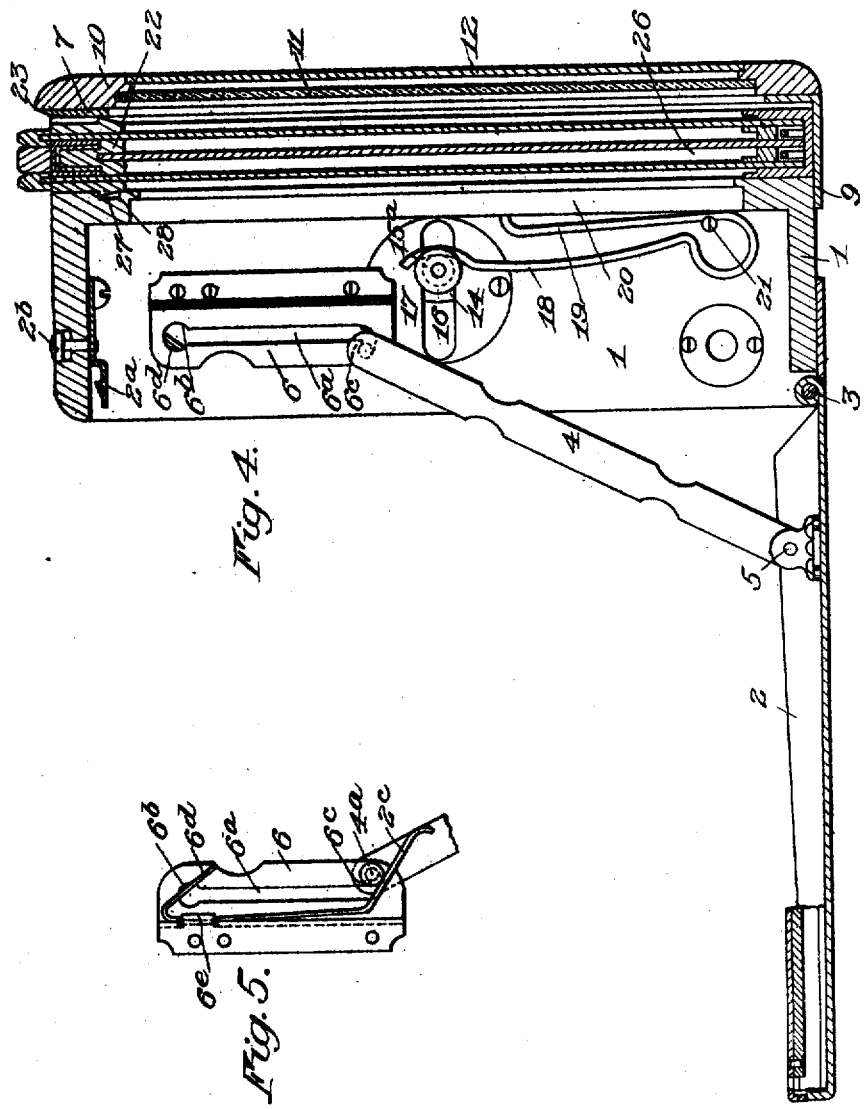

UNITED STATES PATENT OFFICE.

JOHN A. ROBERTSON, OF ROCHESTER, NEW YORK, ASSIGNOR TO EASTMAN KODAK CO., OF ROCHESTER, NEW YORK, A CORPORATION OF NEW YORK.

CAMERA.

No. 917,135.  Specification of Letters Patent.  Patented April 6, 1909.

Application filed October 2, 1907. Serial No. 395,482.

*To all whom it may concern:*

Be it known that I, JOHN A. ROBERTSON, of Rochester, in the county of Monroe and State of New York, have invented certain new and useful Improvements in Cameras; and I do hereby declare the following to be a full, clear, and exact description of the same, reference being had to the accompanying drawings, forming a part of the specification, and to the reference numerals marked thereon.

My present invention relates to photographic cameras and particularly to the type adapted for the reception of the sensitized material when in the form of plates or cut sheets of film, usually within a holder as distinguished from what are known as roll-holding cameras; and it has for its object to provide a simple and convenient device of this general character which will be light and compact and offer certain advantages in focusing and in the general manipulation of the plates.

To these and other ends the invention consists in certain improvements and combinations of parts, all as will be hereinafter more fully described; the novel features being pointed out in the claims at the end of the specification.

In the drawings: Figure 1 is a side elevation of a camera constructed in accordance with my invention, showing the manner in which the plate holder is inserted. Fig. 2 is a similar view with the plate-holder in place. Fig. 3 is a horizontal section on the line 3ˣ—3ˣ of Fig. 2, but with the camera front extended and the plate-holder removed. Fig. 4 is a vertical longitudinal section on the line 4ˣ—4ˣ of Fig. 3 with the plate holder in place. Fig. 5 is a detail view of one of the brackets.

Similar reference numerals in the several figures indicate similar parts.

In illustrating my invention I have shown it applied to a camera of the folding type comprising a box or body 1, having a front 2 hinged at 3 adapted to be rotated outwardly as shown in Fig. 4 and supported in its lowered position by the arms 4 pivoted at their lower ends to the sides of the front at 5 and having their upper ends sliding in brackets 6 on the body. The bellows, lens-board, and related parts have been omitted from the drawings as these may be of the usual or any desired construction. As usual in cameras of this type the front 2 when in the normal position closes the casing and is retained by a spring latch 2ᵃ which may be released by pressure of the operator's finger on a button 2ᵇ. In order to project the front beyond the edge of the casing to permit it to be readily grasped and rotated outwardly I arrange within the camera casing small springs 2ᶜ which engage the inner surface of the door and are placed under tension when the latter is closed. The brackets 6 are provided with attaching portions through which pass the screws employed for securing them to the camera casing, the remainder or forward edges of the brackets being offset and provided with slots 6ᵃ in which are guided the bodies of the studs 4ᵃ on the arms 4. The heads of these studs engage the inner surfaces of the brackets and are passed into engagement therewith through the enlargements 6ᵇ provided at the upper ends of the slots. The lower ends of the latter are curved forwardly and upwardly, as shown in Figs. 4 and 5, forming a projection 6ᶜ adapted to engage in rear of said studs to prevent the accidental movement of the door or front when in an open position. It is essential however, in order to effect the interlocking of these parts that the arms 4 be rotated about their pivots 5 to move their upper ends slightly to raise their studs from the bottom of the slots to a position in front of the projections 6ᶜ and to this end the springs 2ᶜ are so located as to accomplish this object after performing their major function of ejecting the door. The slots 6ᵃ are of such a length that when the door 2 is closed the studs 4ᵃ will register with the apertures 6ᵇ through which they may be moved laterally, but in order to prevent this action occurring accidentally guards in the form of a spring finger 6ᵈ are arranged to deflect the studs and retain them in engagement with one side of said opening so that their heads will be retained in engagement with the inner faces of the brackets at these points. In practice I form each of the springs 2ᶜ of a narrow strip of metal and locate it between the offset portion of the bracket 6 and the side of the camera casing, securing it to the bracket by passing its upper end beneath a strap 6ᵉ struck up from the shoulder thereon, the upper extremity of the spring being bent over and crossing the enlargement or aperture 6ᵇ to form the guard 6ᵈ, as shown in Fig. 5.

The rear end or back of the camera which is adapted to receive a plate-holder, or film pack, is provided with the usual focusing screen and is adapted to move rearwardly on the casing 1 to permit the insertion of the plate-holder to position a plate therein in the field of the lens normally occupied by the focusing screen, and in this position the plate-holder is securely held by said camera back. The latter constitutes part of the casing and comprises a rear wall 7, side walls 8 and a bottom 9 preferably made of a single sheet of metal and formed by suitable dies. The rear wall 7 is backed by a rectangular frame 10 and is provided with an aperture in which is located the usual ground glass focusing screen 11, access to which may be had by opening the door or cover 12 hinged at one edge to said backing frame as indicated at 12ᵃ and normally retained in closed position by a spring latch 13.

In order to reduce the dimensions of the camera and produce a compact and serviceable article the back portion is arranged to telescope on the body 1 and the sides and bottom of the latter are reduced for a distance approximately one half their width to receive the corresponding side walls 8 and bottom 9, as shown. The side walls 8 are each provided at points intermediate their length with forwardly projecting ears 14 carrying studs 15 projecting inwardly through elongated apertures 16 which limit the outward movement of the camera back. The inner edges of the slots are reinforced by wear plates 17 attached to the inner faces of the walls of the body 1. Also secured to the latter are springs which engage the studs 15 and serve to move the latter toward the forward ends of the slots. The springs may be conveniently made of spring wire, as shown in Fig. 4, the end 18 of each being adapted to coöperate with the stud 15 while its other extremity 19 engages the rear wall 20 of the body and is secured beneath the head of a screw 21. Each of the studs is screw threaded and provided with a removable collar having a head 15ᵃ beneath which the end 18 of the spring may engage. The ears 14 are preferably made semicircular and the studs therein located midway between the upper and lower ends of the side walls as this arrangement of the parts permits the camera back to tilt upon the studs, as shown in Fig. 1, when a plate holder is inserted or removed. When the back is uniformly extended against the tension of the springs the flanges thereon remain in engagement with the body forming a chamber between said parts, the ears or projections 14 acting to guide and steady the back in this position.

The camera lens may be focused in the usual manner when the back is closed or retracted as shown in Fig. 3 which places the screen 11 adjacent the rear of the camera body. The plate-holder 22 may then be inserted by engaging its lower edge with the bevel 23 provided at the top of the back, when pressure in a rearward direction may be applied to the latter to tilt it outwardly upon its sliding pivots 15, as shown in Fig. 1. The beveled edge 23 guides the plate holder when first inserted within the chamber then formed in rear of the body, and the downward movement of the plate holder forces the back rearwardly until the lower edge of the holder passes the pivotal points of the back when the latter will tilt or rock into a position parallel to the body as shown in Fig. 2, the plate holder being then firmly held by the tension of the springs 18. A plate occupying one of the plate-chambers 26 will thereby be brought into the plane previously occupied by the focusing screen (the parts being relatively proportioned to this end) so that it will automatically be brought into the correct and previously adjusted focus of the lens.

The plate-holder itself may be of the usual construction, the form shown being of the reversible type, and provided at one end with a transversely extending rib 27 which coöperates with an abutment formed by a corresponding groove 28 on the camera body to prevent accidental outward movement of the holder while in use, the abutments being held in engagement by the inward pressure of the back and released by an outward movement imparted thereto.

The construction herein described furnishes an instrument of great efficiency, and capable of convenient manipulation while both strong and compact.

I claim as my invention:

1. In a camera, the combination with a body, of an extensible back therefor having a loose yielding connection with the body, flanges on one of said members normally arranged in telescopic engagement with the other and forming a chamber between the body and back when the latter is extended and rigid projections on one of the members engaging the other as guides when the back is in said extended position.

2. In a camera, the combination with a body having a reduced portion and a recess adjacent thereto, of an extensible back having a loose, yielding connection with the body, flanges on the back normally arranged in the telescopic engagement with the reduced portion of the body and forming a chamber between the body and back when the latter is extended and projections on the flanges normally resting in the recesses in the body and engaging the latter as guides when the back is in extended position.

3. In a camera, the combination with a body, of an extensible back therefor movable relatively thereto, one of said members being provided with slots extending in the direction of relative movement of the members, and pins on the other projecting within the slots.

4. In a camera, the combination with a body provided with slots, of an extensible back therefor movable relatively thereto and having flanges arranged in telescopic engagement with the exterior of the body, pins projecting inwardly from said flanges and through the slots and tension members arranged within the body and engaging the pins.

5. In a camera, the combination with a body provided with slots, of an extensible back therefor movable relatively thereto and having flanges arranged in telescopic engagement with the exterior of the body, pins projecting inwardly from said flanges and through the slots, sleeves secured to the pins and having headed portions on the inner sides of the body and tension members mounted within the latter and engaging beneath the heads of the sleeves.

6. In a camera, the combination with a casing having an open front, a pivoted door for closing the front and a link extending between the casing and door for supporting the latter in open position, of a guide plate on the casing supporting the end of the link, means on the plate for locking the link when the door is fully extended and a spring attached to the plate and adapted to engage the door when in the closed position and to throw the link into coöperation with said locking means when the door is fully opened.

7. In a camera the combination with a casing having an open front, a pivoted door for closing the casing and a link extending between the casing and door for supporting the latter in open position, of a guide plate on the casing having a slot provided with a hooked end, a stud on the link projecting into the slot and a spring arranged to coöperate with the door when it is closed to eject it from the casing and to coöperate with the stud to move it into the hooked end of the slot when the door is opened.

8. In a camera the combination with a casing having an open front, a pivoted door for closing the casing and a link extending between the casing and door for supporting the latter in open position, of a guide plate on the casing having a slot provided with an enlargement at one end and a hook at its other extremity, a headed stud on the link adapted to pass through the enlargements, a spring secured to the guide plate having two ends adapted to coöperate with the stud to deflect it at each end of the slot.

JOHN A. ROBERTSON.

Witnesses:
F. M. WARN,
C. E. HUTCHINGS.